United States Patent Office 3,718,160
Patented Feb. 27, 1973

3,718,160
DEVICE FOR CONTROLLING AIR FLOW IN VENTILATION PIPES
Pierre Charles Jules Jardinier, Gournay-sur-Marne, and Jack Paul Robert Simonnot, Lesigny, France, assignors to Societe d'Etudes et de Recherches de Ventilation et d'Aeraulique, Villiers-sur-Marne, France
Filed Apr. 1, 1971, Ser. No. 130,325
Int. Cl. F15d 1/02
U.S. Cl. 138—46  7 Claims

ABSTRACT OF THE DISCLOSURE

This invention relates to a device which, without making use of any source of energy other than the motive pressure of air circulating in a pipe, enables the flow of air in this said pipe to be stabilised to a constant value; the said device, by virtue of its design, being able without any supplementary means to smooth out the effect of violent fluctuations of pressure, at the same time retaining good response sensitivity to progressive changes of pressure of low amplitude, said device having at least one chamber of which part of, or the whole of the walls can undergo elastic deformation,
a seating associated with this chamber in such a way as to provide an air passage between this seating and the outside walls of the chamber,
means which, when such a device is fitted in a pipe in which is maintained a motive pressure capable of assuring air circulation, enable a pressure equal to that upstream of the device to be present inside the chamber.

---

Figure 1:
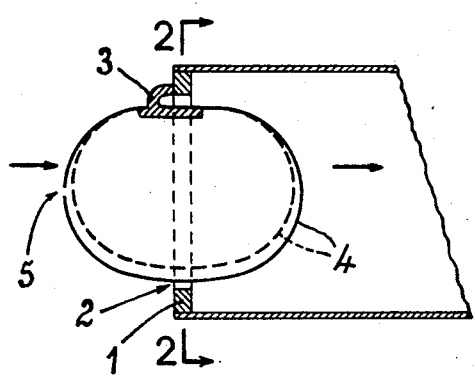

The present invention relates to a device which, when subjected to the direct action of changes in air pressure in a pipe, enables the air flow in the same pipe to be stabilised to a constant value, without any other supplementary sources of energy.

Known devices of this kind, in order to be sensitive to slight changes of pressure, have throttling components of low inertia which modify the air passage as a function of the pressure. Such installations respond very quickly to violent changes of pressure, and as a consequence amplify them, a fact which can set up a state of sustained oscillations in the pipes connected to ventilators.

To use such devices in mechanical ventilation or air conditioning systems it is then obligatory to incorporate with them some supplementary means of smoothing the oscillations.

An object of the present invention is to remedy these disadvantages.

The invention relates to a device which, without making use of any source of energy other than the motive pressure of air circulating in a pipe, enables the flow of air in this said pipe to be stabilised to a constant value; the said device, by virtue of its design, being able without any supplementary means to smooth out the effect of violent fluctuations of pressure, at the same time retaining good response sensitivity to progressive changes of pressure of low amplitude.

The device which forms the subject of the invention has:

at least one chamber of which part of, or the whole of the walls can undergo elastic deformation,
a seating associated with this chamber in such a way as to provide an air passage between this seating and the outside walls of the chamber,
means which, when such a device is fitted in a pipe in which is maintained a motive pressure capable of assuring air circulation, enable a pressure equal to that upstream of the device to be present inside the chamber.

According to a first characteristic of the invention, the whole of the walls of the chamber are subjected on the inside to the pressure ruling upstream of the device, and a portion of these same walls is subjected on the outside to lower pressures ruling at their level or downstream, and, when there is a change in the difference between the pressures existing upstream and downstream respectively of the device, this causes elastic deformation of the chamber and a change in its volume, which modifies the air passage between its outside walls and the seating in such a way as to keep the flow constant.

According to another characteristic of the invention, the means which enable the pressure inside the chamber to become equal to the upstream pressure offer considerable resistance to the air circulation between the inside and the outside of the chamber when the volume of the latter changes, and this slows down its deformation and consequently reduces the effect of violent fluctuations of pressure.

Figure 2:
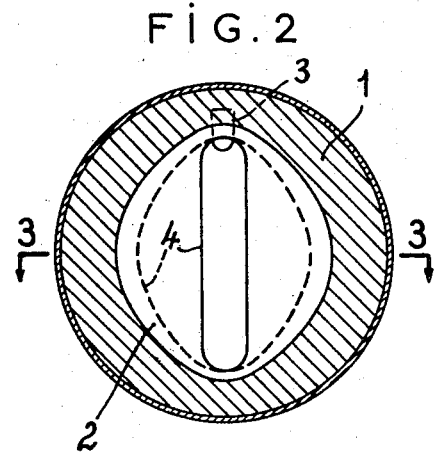
Figure 3:
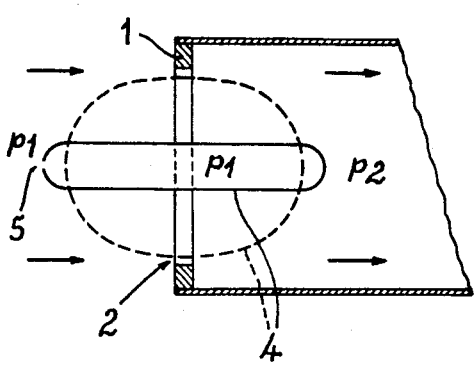
Figure 4:
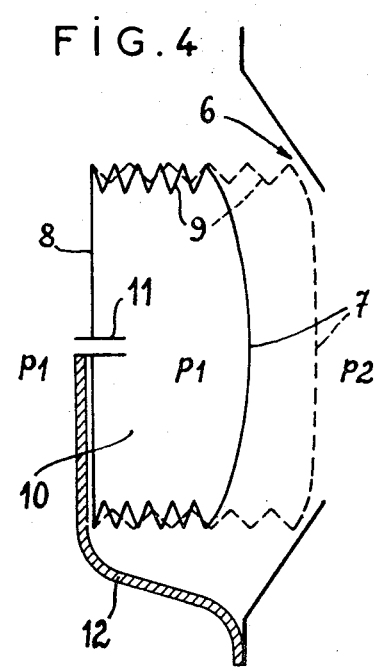
Figure 5:
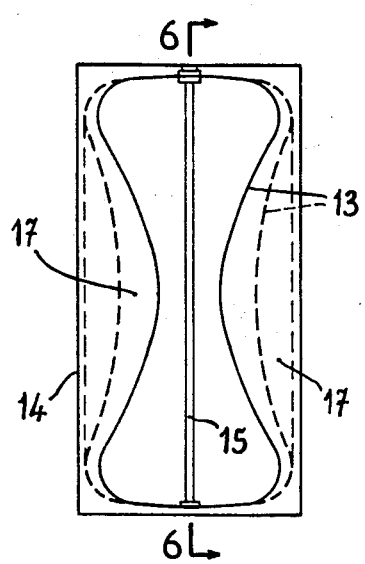
Figure 6:
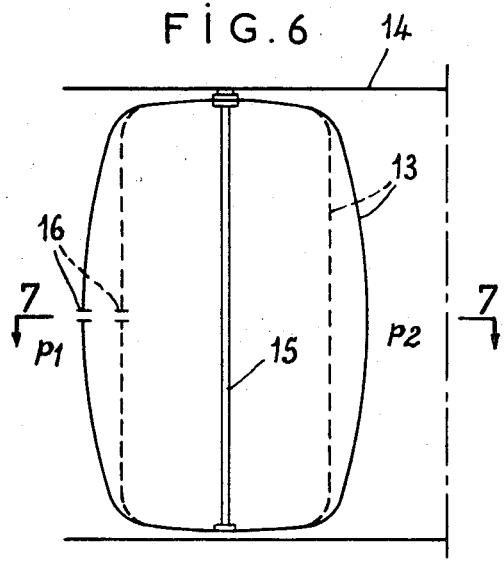
Figure 7:
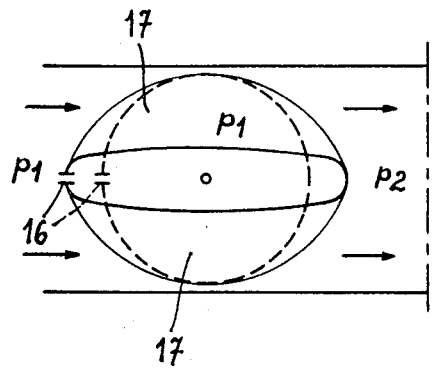

The invention will now be described in greater detail, by way of non-restrictive examples, shown in the accompanying drawings; in which:

FIG. 1 is a side view in longitudinal section of a first embodiment of the device according to the invention, when the bladder is in the inflated condition;
FIG. 2 is a sectional view on the line 2—2 of FIG. 1, when the bladder is in the deflated condition;
FIG. 3 is a longitudinal sectional view on the line 3—3 of FIG. 2, when the bladder is in the deflated condition;
FIG. 4 is a side view in longitudinal section of a second embodiment of the device according to the invention;
FIG. 5 is a transverse sectional view of a third embodiment of the device according to the invention;
FIG. 6 is a longitudinal sectional view on the line 6—6 of FIG. 5; and
FIG. 7 is a sectional view on the line 7—7 of FIG. 6.

In the embodiment of the device shown in FIGS. 1, 2 and 3, a disc 1 has an elliptical opening 2, across which is held, by means of a support 3, a rubber bladder 4 constituting a chamber, the disc forming a seating with which the outside wall of the bladder is associated, in use. The space between the outside wall of the bladder and the seating provided by the disc constitutes an air passage of variable dimension as will be described later. The said bladder 4 has an aperture 5 through which its interior volume communicates with the ambient air just upstream of the device.

The mode of operation of the device is as follows: when the difference between the pressures $p_1$ and $p_2$, respectively, existing upstream and downstream of the device, is zero, the bladder 4 assumes the flattened shape shown in full lines in FIGS. 2 and 3 and in dotted lines in FIG. 1 and the dimension of the air passage is at a maximum.

On the other hand, when the difference $p_1$ and $p_2$ increases, the bladder 4 begins to expand and to assume the shape shown in full lines in FIG. 1 and in dotted lines in FIGS. 2 and 3. Thus it reduces the dimension of the air passage provided between its walls and the seating edges of the opening 2. The passage thus demarcated becomes smaller as $p_1-p_2$ increases, and this enables a constant flow of air to occur through the device for values of $p_1-p_2$ which can vary over a very wide range of pressure. The aperture 5 has a small cross section and offers considerable resistance to the air circulation between the inside and outside of the bladder 4. This prevents a sudden change in the volume of the bladder which might modify the air passage too quickly and so amplify the instantaneous fluctuations of pressure.

The embodiment of the device shown in FIG. 4 has a tapered passage 6 whose walls form the seating and in which is coaxially arranged a cap 7 which is partly spherical joined to a rigid circular base 8 by impervious elastic bellows 9 so as to form a deformable chamber 10 which communicates with the ambient air by means of a tube 11; the latter has a small cross section and is also used to fix the base 8 to a support 12 which forms one piece with the passage 6.

When pressures $p1$ and $p2$ are equal, there is no air flow circulating in the passage 6 and the chamber 10 is in the position shown by full lines and gives maximum clearance between the passage 6 and the cap 7. A difference between the upstream pressure $p1$ and the downstream pressure $p2$ causes a translation movement of the cap 7 in the longitudinal axis of the passage 6, a movement which is opposed by the elasticity of the bellows 9. For a given value of the difference $p1-p2$, this not being zero, the forces exerted by the pressure and the forces exerted by the return pull of bellows 9 equalise each other, and the cap 7 takes up the position shown in dotted lines. The variable throttling of the passage 6 by the cap 7, which is a function of the difference $p1-p2$, enables an air flow of a constant amount to be obtained in this passage over a wide range of differences $p1-p2$.

The tube 11 has a small cross section and offers considerable resistance to the passage of air between the inside and the outside of the chamber 10. This slows down the changes in its volume and consequently prevents instantaneous movements of the cap 7 which might amplify sudden changes in the difference $p1-p2$.

So as to obtain a performance which is practically independent of the location of the device over a given range of pressure differences $p1-p2$, the cap 7 is designed of light construction, whilst the bellows 9 are designed to be able adequately to withstand transverse shearing strains, in order that gravity may have a negligible effect in comparison to that exerted by the difference $p1-p2$ over the selected range of use.

In the embodiment of the device shown in FIGS. 5 to 7, the deformable chamber is formed by an envelope 13 of elastic material, such as rubber. When fully inflated this envelope has the shape of a cylinder, closed at both ends by walls which are perpendicular to its longitudinal axis, as shown in dotted lines in FIGS. 5 to 7. On the other hand, in the deflated condition its side walls form two hollows which are concave towards the outside and are symmetrically arranged in relation to its median plane, as shown in full lines in the same figures, and in a partially inflated condition lies between these two shapes. The said envelope in its transverse section has the shape of an ellipse of which the larger axis is substantially parallel to the longitudinal axis of the corresponding pipe.

As shown in the figures, this envelope 13 is fixed across a pipe 14 of rectangular cross section by means of a rod 15 which is firmly joined to the two ends of the said envelope and to the pipe 14.

The envelope is equipped with a tube 16 of small section which puts the deformable chamber formed by the envelope in communication with the ambient air, and which leads to the upstream side of the device, so that the pressure ruling in this chamber is equal to the upstream pressure $p1$.

The way in which this device works is as follows:

When the upstream pressure $p1$ and the downstream pressure $p2$ are equal, the envelope 13 is in the deflated condition. In this way it forms, together with the walls of the pipe 14, two passages 17 whose cross section is at a maximum dimension.

On the other hand, when there is a pressure difference $p1-p2$, the envelope 13 is deformed, tends progressively to assume a cylindrical shape, and causes a reduction in cross section of the passages 17. Thus it enables the amount of air flowing through the device to be kept constant over a given range of values of $p1-p2$.

What we claim is:

1. A device for controlling the flow of the airstream through a pipe; comprising leakproof chamber means having at least one flexible wall means elastically deformable in response to the motive pressures of said airstream; a complementary stationary wall in said passageway forming a valve seat so as to define with said flexible wall means a variable flow passage for said airstream at a stabilized discharge rate over a predetermined range of motive pressures; orifice means in said chamber means communicating the interior thereof with said airstream upstream only of said pipe, said chamber means imparting appreciable pressure losses to said airstream downstream so as to constitute a dampener, said flexible wall means being expandable without elongation in response to upstream motive pressures when subjected to low pressure ventilation systems.

2. A device as claimed in claim 1, said orifice means being of small cross-section relative to the interior of said chamber means so as to restrict flow of air into and out of said chamber means.

3. A device as claimed in claim 1, said chamber means comprising a rigid base member fastened to said pipe, said flexible wall means including an elastic bellows having one end joined to said base member, and a displaceable cap fastened to the other end of said bellows adjacent said complementary stationary wall so as to define said variable flow passage therebetween.

4. A device as claimed in claim 3, said complementary stationary wall being tapered to form said valve seat.

5. A device as claimed in claim 3, said orifice means being formed in said base member.

6. A device as claimed in claim 1, said chamber means comprising an envelope of elastic material.

7. A device as claimed in claim 6, said elastic envelope being cylindrically-shaped when fully inflated, and having concave outer surface walls in deflated condition.

References Cited

UNITED STATES PATENTS

| 2,910,093 | 10/1959 | Dahl | 138—46 |
|---|---|---|---|
| 1,873,138 | 8/1952 | Mitchell | 138—45 X |
| 2,577,405 | 12/1951 | Cones | 138—45 |
| 3,265,090 | 8/1966 | Elliott | 138—45 |

FOREIGN PATENTS

| 789,467 | 8/1935 | France | 138—45 |

HERBERT F. ROSS, Primary Examiner

U.S. Cl. X.R.

138—45